(12) United States Patent
Shikakura et al.

(10) Patent No.: US 6,304,990 B1
(45) Date of Patent: *Oct. 16, 2001

(54) ERROR CORRECTION AND CONCEALMENT TECHNIQUE

(75) Inventors: Akihiro Shikakura, Kawasaki; Nobuhiro Hoshi; Yushi Kaneko, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,121

(22) Filed: May 26, 1998

Related U.S. Application Data

(62) Division of application No. 08/657,194, filed on Jul. 3, 1996, now Pat. No. 5,809,041, which is a division of application No. 08/402,978, filed on Mar. 13, 1995, now Pat. No. 5,717,705, which is a continuation of application No. 07/813,834, filed on Dec. 27, 1991, now abandoned.

(30) Foreign Application Priority Data

| Dec. 28, 1990 | (JP) | 2-408922 |
| Dec. 28, 1990 | (JP) | 2-408923 |
| Dec. 28, 1990 | (JP) | 2-408942 |
| Dec. 29, 1991 | (JP) | 3-009063 |

(51) Int. Cl.[7] .................................................. G06F 11/00
(52) U.S. Cl. ........................................... 714/747; 714/754
(58) Field of Search ................................... 714/747, 754; 386/47; 348/617

(56) References Cited

U.S. PATENT DOCUMENTS

| 3,688,039 | * 8/1972 | Ishiguro | 714/747 |
| 4,189,748 | 2/1980 | Reis | 358/133 |
| 4,329,708 | * 5/1982 | Yamamoto et al. | 348/617 |
| 4,381,519 | * 4/1983 | Wilkinson et al. | 358/21 R |
| 4,555,729 | 11/1985 | Driessen | 358/133 |
| 4,567,518 | 1/1986 | Driessen | 358/133 |
| 4,684,923 | 8/1987 | Koga | 340/347 |
| 4,688,100 | 8/1987 | Haganuma et al. | 358/261 |

(List continued on next page.)

FOREIGN PATENT DOCUMENTS

| 63-015581 | 1/1988 | (JP) . |
| 2-030284 | 1/1990 | (JP) . |
| 131671 | 5/1990 | (JP) . |
| WO87/2210 | 4/1987 | (WO) . |

OTHER PUBLICATIONS

IEE Proc., vol. 135, Pt. F., No. 6 Dec. 1988, pp. 528–538, "Effect of channel errors on source coded image data etc".
Symposium Record Broadcast Sess., 16th Int. TV Symp. Jun. 17–22, 1989, pp. 387–409, Grotz et al. "Imaging Coding Techniques, etc".

(List continued on next page.)

*Primary Examiner*—Albert Decady
*Assistant Examiner*—David Ton
(74) *Attorney, Agent, or Firm*—Fitzpatrick, Cella, Harper & Scinto

(57) ABSTRACT

An image processing apparatus comprises a receiving device for receiving encoded image data which is encoded by using orthogonal transform in a predetermined block unit, an error detecting device for detecting a transmission error of the encoded image data, a correcting device for correcting the transmission error in the predetermined block unit, and a decoding device for decoding the encoded image data and outputting image data for reproducing an image. The image processing apparatus satisfactorily controls the amount of compressed data and prevents a deterioration of image quality even if any error occurs on a transmission path, thereby reproducing good image quality.

9 Claims, 14 Drawing Sheets

U.S. PATENT DOCUMENTS

| | | | | |
|---|---|---|---|---|
| 4,706,111 | * | 11/1987 | Abe et al. | 348/617 |
| 4,719,642 | | 1/1988 | Lucas | 375/30 |
| 4,727,421 | | 2/1988 | Koga | 358/133 |
| 4,774,590 | | 9/1988 | Haganuma et al. | 358/280 |
| 4,807,033 | | 2/1989 | Keesen et al. | 358/167 |
| 4,903,124 | | 2/1990 | Hoshi et al. | 358/133 |
| 4,903,269 | | 2/1990 | Fedele | 371/57.2 |
| 4,974,078 | | 11/1990 | Tsai | 358/133 |
| 4,975,866 | | 12/1990 | Aoki et al. | |
| 4,977,550 | | 12/1990 | Furuya et al. | 369/32 |
| 5,006,931 | | 4/1991 | Shiroto | 358/133 |
| 5,023,919 | | 6/1991 | Wataya | 358/167 |
| 5,054,103 | | 10/1991 | Yasuda et al. | 382/56 |
| 5,070,503 | | 12/1991 | Shikakura | 371/37.1 |
| 5,142,537 | * | 8/1992 | Kutner et al. | 714/747 |
| 5,184,316 | | 2/1993 | Sugiyama | 364/715.02 |
| 5,193,010 | * | 3/1993 | Juri et al. | 358/336 |
| 5,212,695 | | 5/1993 | Shikakura et al. | 371/37.1 |
| 5,227,875 | | 7/1993 | Suu et al. | 358/133 |
| 5,235,434 | | 8/1993 | Wober | 358/133 |
| 5,283,635 | | 2/1994 | Suzuki et al. | 358/516 |
| 5,289,190 | | 2/1994 | Shimoda et al. | 341/50 |
| 5,325,374 | | 6/1994 | Hoshi et al. | 371/43 |
| 5,327,247 | | 7/1994 | Osborne et al. | 348/100 |
| 5,371,603 | | 12/1994 | Nishino et al. | 358/335 |
| 5,446,744 | | 8/1995 | Nagasawa et al. | 371/37.4 |
| 5,604,539 | | 2/1997 | Ogasawara et al. | 348/423 |
| 5,805,302 | | 9/1998 | Enari et al. | 358/433 |

OTHER PUBLICATIONS

Supercomm/ICC'90, Apr. 15–19, 1990, pp. 890–903, Fazel et al., "Application of Unequal Error Protection Codes, etc".

IEEE Trans. Consumer Elec. vol. 35, No. 3, Aug. 1989, Yamamitsu et al., pp. 450–457, "An Experimental Study For A Home–Use Digital VTR".

Barbero M. et al.: "Coding Strategies Based On DCT For the Transmission Of HDTV" Signal Processing Of HDTV, L'Aquila, Feb. 29–Mar. 2, 1988, No. Workshop 2, Feb. 29, 1988, Chiariglione L., pp. 503–508.

* cited by examiner

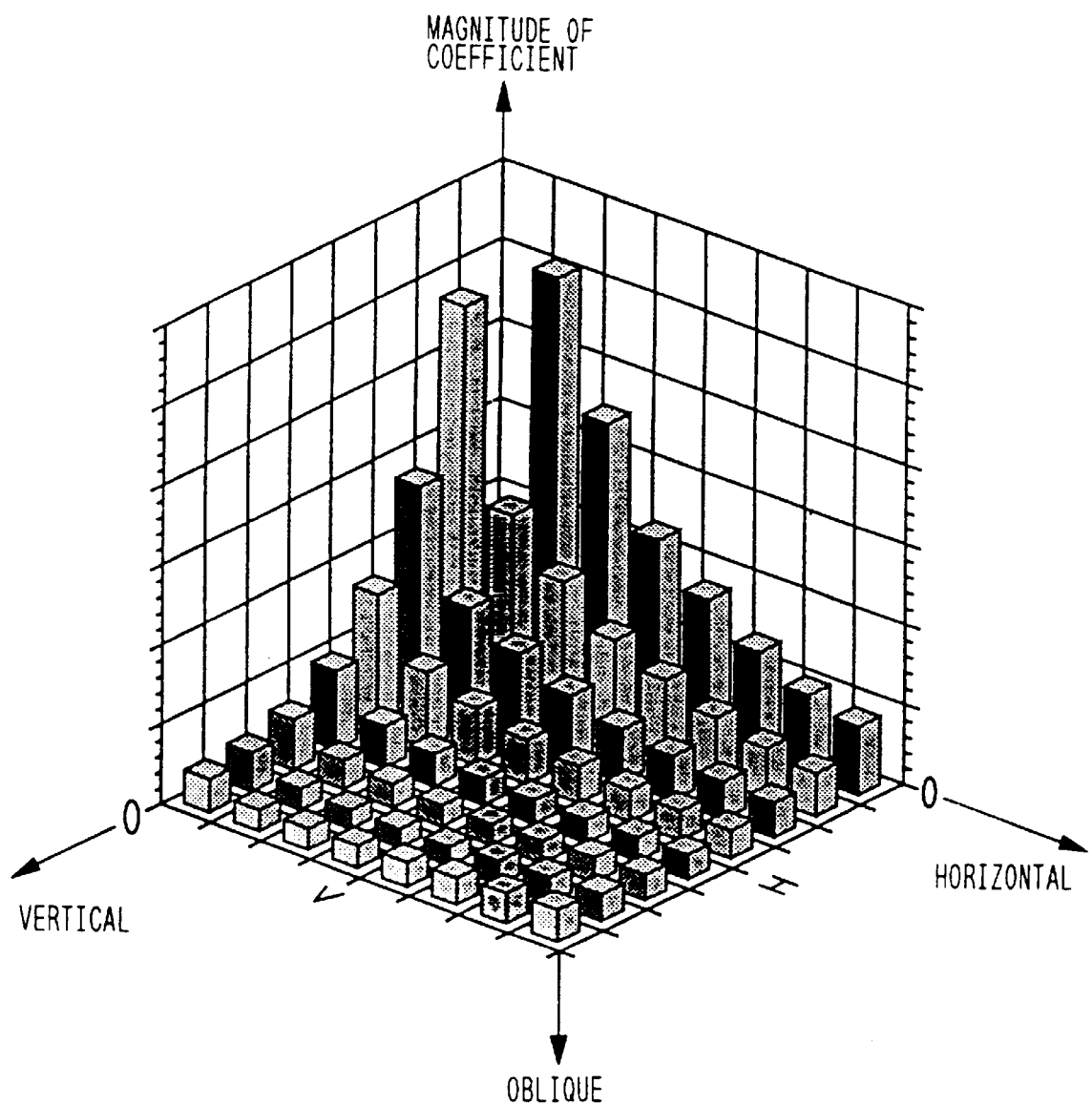

| SYNC | DATA |
| --- | --- |
| SYNC | DATA |
| SYNC | DATA |
| SYNC | DATA |
| SYNC | DATA |
| SYNC | DATA |
| SYNC | DATA |

ERROR CORRECTION AND CONCEALMENT TECHNIQUE

This application is a division of application Ser. No. 08/657,194 filed Jul. 3, 1996, now U.S. Pat. No. 5,809,041, which is a division of application Ser. No. 08/402,978 filed Mar. 13, 1995, now U.S. Pat. No. 5,717,705, which is a continuation of application Ser. No. 07/813,834 filed Dec. 27, 1991, now abandoned.

BACKGROUND OF THE INVENTION

1. Field of the Invention

The present invention-relates to an image processing apparatus, and more particularly to an image processing apparatus equipped with image decoding means which has a function of expanding compressed image data, for example.

2. Related Background Art

Conventionally, there is known a technique for transmitting image data after performing a frequency transform (transformation) of image data for each block to make data compression. In particular, by separating frequency components into a high-frequency component and a low-frequency component and encoding those components separately from each other, compression efficiency of images is increased.

However, the above prior art has had a disadvantage that if an error occurs during transmission of encoded data, an image signal including false image data is reproduced and image quality deteriorates remarkably. In the case of using a variable-length code in encoding the above high-frequency component, it may sometimes happen that even the number of data is not reproduced accurately and a gross deterioration of image quality such as missing image data occurs.

Meanwhile, in the field of transmitting images in the digital form, there have also conventionally been proposed a variety of encoding methods for cutting down the quantity of information before transmitting images because the quantity of information is very large.

Among them, there is known a method of carrying out an orthogonal transform, quantizing a coefficient after the transform, and forming a variable-length code.

With the above-mentioned prior art including no error detecting means, however, if an error occurs in a transmission path, such an error cannot be corrected, leading to a gross deterioration of image quality.

Especially, in the event of exceeding a dynamic range capable of decoding and reproducing when encoded data after transmission is decoded, for example, image quality deteriorates.

Moreover, in an image transmission system of the type in which a moving image signal is digitized and image data is transmitted via transmission paths such as optical fibers or communication satellites and recording media such as magnetic tapes, an error correcting code (ECC) for detecting and correcting a transmission error is utilized to correct the transmission error in the reception side (or the reproduction side) based on the error correcting code. That error which cannot be corrected by using the error correcting code is subjected to interpolation processing to form an approximate value from surrounding pixels.

In order to avoid a deterioration of image quality caused by the interpolation processing, it is required that the surrounding pixels utilized for the interpolation are free from errors. When adopting highly efficient encoding (image compression) which has been widely used in recent years, the surrounding pixels capable of being utilized for the interpolation are restricted. In a DPCM (difference pulse code modulation) method wherein reset is made for each line, for example, if a correction impossible error occurs, the original data cannot be reproduced by using the line inclusive of the error. Accordingly, only those pixels which are included in the upper and lower lines can be utilized for interpolation in this case. Further, in an encoding method that uses an orthogonal transform such as a discrete cosine transform (DCT), if a correction impossible error occurs, all the pixels included in a transmission block (e.g., 8 pixels vertical×8 pixels horizontal) cannot be used to reproduce the original signal. As a result, a deterioration of image quality cannot be prevented even by the interpolation using the upper and lower lines.

Thus, even in an attempt of performing the interpolation in the same frame, no effect may be expected depending on the coding methods.

Additionally, in the field of transmitting information such as images and voices in the digital form, there have been proposed various encoding methods for cutting down the amount of data transmitted. One known run-length coding method is to encode data by combining the number of successive 0s and a value other than 0 into a set. On the other hand, a forecast difference encoding method or a difference pulse code modulation (hereinafter referred to as DPCM) encoding method is also known which compresses information by utilizing correlation between sample values close to each other. There is further known an encoding method that the above two methods are combined with each other. FIG. 14 is a block diagram showing the encoding method in a combination of the two methods. Image data of 8 bits inputted through an input terminal 611 is applied to a DPCM encoder 613 for DPCM encoding into 4 bits. Specifically, the DPCM encoder 613 assigns DPCM codes of 4 bits to respective difference values as shown in Table 1 below.

TABLE 1

| Range of Difference Values | DPCM Code | Representative Value of Difference |
|---|---|---|
| −255~−94 | 15 | −140 |
| −93~−70 | 13 | −80 |
| −69~−50 | 11 | −58 |
| −49~−34 | 9 | −40 |
| −33~−22 | 7 | −27 |
| −21~−13 | 5 | −17 |
| −12~−6 | 3 | −8 |
| −5~−2 | 1 | −3 |
| −1~1 | 0 | 0 |
| 2~5 | 2 | 3 |
| 6~11 | 4 | 8 |
| 12~20 | 6 | 15 |
| 21~35 | 8 | 27 |
| 36~53 | 10 | 44 |
| 54~93 | 12 | 70 |
| 94~255 | 14 | 150 |

An image generally has correlation between sample values close to each other such that many difference signals occur as 0 and many DPCM codes occur as 0. The DPCM codes encoded into 4 bits are outputted to a run-length encoder 615. As shown in FIG. 15A, the run-length encoder 615 combines the DPCM code other than 0 and the number of successive 0s (hereinafter referred to as a 0 run-length) before the DPCM code into a set for each DPCM code of 4 bits.

At this time, by limiting the 0 run-length to 16 at maximum, the run-length codes can be each expressed in 8 bits. The 8-bit run-length codes thus encoded by the run length encoder 615 are added with a reset synch bit in a transmission format unit 617 as shown in FIG. 15B and then delivered to an output terminal. The reset synch bit is added, for example, after processing of each line.

FIG. 13 is a block diagram showing a configuration of a decoder device in cooperation with the encoding section of FIG. 14. The run-length code and the reset synch bit both transmitted through a transmission path are applied to an input terminal 621, and a run-length decoder 623 decodes the DPCM code by inserting 0s in the number corresponding to the 0 run-length before each DPCM code until arrival of the reset synch bit. The data decoded to the DPCM code is outputted to a DPCM decoder 625 for decoding to image data of 8 bits, which are then delivered to an output terminal 627.

With the above conventional method, however, if an error occurs in a transmission path, such an error cannot be corrected and image quality deteriorates remarkably because of including no error detecting means.

As mentioned before, in the field of transmitting information such as images and voices in the digital form, there have been proposed various encoding methods for cutting down the amount of data transmitted. One known run-length coding method is to encode data by combining the number of successive 0s and a value other than 0 into a set. On the other hand, a transform encoding method is also known which performs an orthogonal transform of pixels to be transmitted and quantizes transmitted data. There is further known an encoding method that the above two methods are combined with each other.

With the above conventional methods, however, if an error occurs in a transmission path, such an error cannot be corrected and image quality deteriorates remarkably because of including no error detecting means.

Meanwhile, U.S. Pat. No. 5,023,919 has been proposed with an intention to correct or avoid a deterioration on the side decoding compressed data, but has not yet succeeded in sufficiently solving the problem.

SUMMARY OF THE INVENTION

The present invention has been made in view of the situations in the prior art as set forth above, and its object is to provide an image processing apparatus which can satisfactorily control the amount of compressed data.

To achieve the above object, in accordance with the present invention, there is disclosed an image processing apparatus comprising, receiving means for receiving encoded image data which is encoded by using an orthogonal transform in a predetermined block unit, error detecting means for detecting a transmission error of the encoded image data, correcting means for correcting the transmission error in the predetermined block unit, and decoding means for decoding the encoded image data and outputting image data for reproducing an image.

Another object of the present invention is to output a moving picture of high quality.

To achieve the above object, in accordance with the present invention, there is disclosed a moving picture processing apparatus comprising receiving means for receiving a plurality of pictures of encoded image data sequentially which is encoded by using an orthogonal transform in a predetermined block unit, error detecting means for detecting a transmission error of one of the plurality of pictures, correcting means for correcting the transmission error by using encoded image data of another picture, and decoding means for decoding the encoded image data and outputting a plurality of pictures of image data sequentially for reproducing an image.

Still another object of the present invention is to improve a decoding method of encoded data which in encoded by run-length encoding. To achieve the above object, in accordance with the present invention, there is disclosed an image processing apparatus comprising receiving means for receiving an encoded orthogonal transform coefficient which is encoded by using run-length encoding method, decoding means for decoding the encoded orthogonal transform co-efficient, error detecting means for detecting a transmission error of the encoded orthogonal transform coefficient based on the orthogonal transform coefficient, and correcting means for correcting the transmission error of the decoded orthogonal transform coefficient.

Still another object of the present invention is to improve an encoding method. To achieve the above object, in accordance with the present invention, there is disclosed an image processing apparatus comprising input means for inputting image data, transforming means for performing an orthogonal transform on the input image data, extracting means for extracting DC component and AC component from the transformed image data, adding means for adding data for error detection to at least one of the DC component and the AC component, and encoding means for encoding the DC component and the AC component.

Other objects and forms of the present invention will be apparent from the following explanation with reference to the drawings and the description in the claims.

BRIEF DESCRIPTION OF THE DRAWINGS

FIGS. 19, 20 and 21 are diagrams for explaining operation of FIG. 17.

DETAILED DESCRIPTION OF PREFERRED EMBODIMENTS (First Embodiment)

An image decoding device according to a first embodiment of the present invention, described below, is featured in comprising means for detecting and correcting an error caused during transmission or in reproduction from a recording medium, and means for replacing decoded data in the relevant block by a predetermined setting value based on error information produced from the detecting and correcting means. After detecting an error caused on a transmission path and carrying out correction processing, if it is found that the relevant block has a DC component free from an error and an AC component still including a correction impossible error, all the data in the relevant block are replaced by a value of the DC component based on such information, so that each pixel value in the relevant block can be replaced by a value close to a true value.

Figure 1:
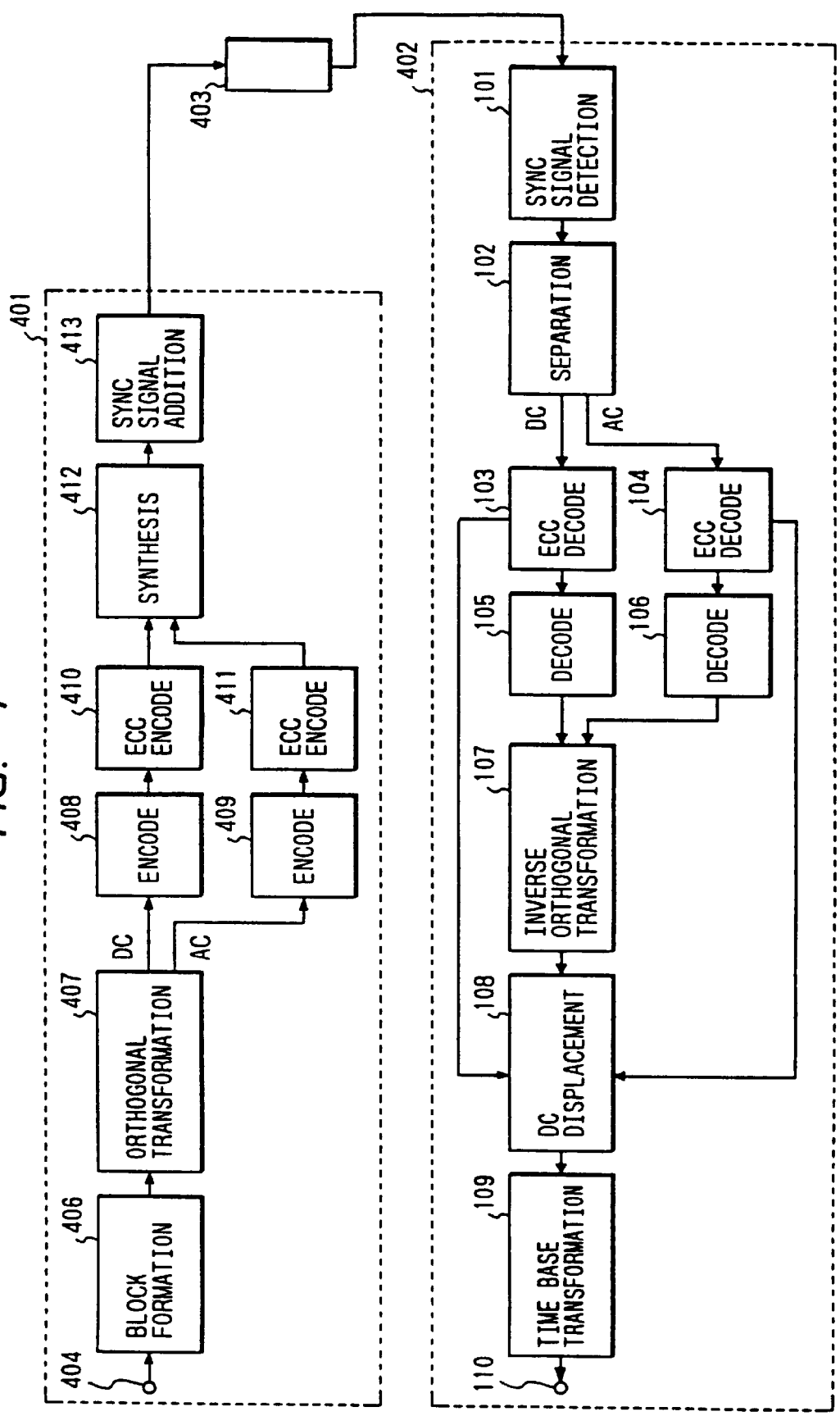
FIG. 1 is a block diagram showing a configuration of a first embodiment of the present invention.

FIG. 1 illustrates a block diagram showing a configuration of an image decoding device and a corresponding image encoding device of this embodiment.

Denoted at reference numeral 401 is an encoding device and 402 is a decoding device, both the devices being connected to each other via a transmission path 403. The transmission path 403 is in the form of a transmission medium for above-ground electric-wave or light spaces, such as an optical fiber, satellite or microwave guide, in the case of instantaneous transmission, and in the form of a storage medium including a tape-like medium such as a digital VTR or DAT, a disk-like medium such as a floppy disk or optical disk, and a solid state medium such as a semiconductor memory.

First, a video signal inputted from an image reader comprising CCD sensors, TV camera, video recorder, host computer or the like is applied to an input terminal 404 of the encoding device 401 and divided in a block formation circuit 406 into blocks each of which comprises a plurality of data, e.g., blocks each consisted of 8×8 pixels. The data thus divided in units of block is transformed in an orthogonal transform circuit 407 into frequency components for each block through, for example, a DCT (discrete cosine transform). The transformed data is outputted as a low-frequency component and a high-frequency component, for example, a DC (direct current) component and an AC (alternating current) component other than the former, in separate fashion. These components are separately encoded by encoding circuits 408, 409 for compressing the amount of information. As examples of the encoding, the DC component may be encoded by a PCM (pulse code modulation) encoding method and the AC component may be encoded by a run-length Huffman encoding method. Respective encoded data outputted from the encoding circuits 408, 409 are further encoded by ECC encoding circuits 410, 411 to have error detecting and correcting codes as a measure for coping with an error possibly caused during transmission, and then synthesized by a synthesis circuit 412 together in a time-serial manner. After that, the synthesized data is added in a synch signal addition circuit 413 with a synch signal for each predetermined number of blocks for the purpose of transmission or recording, followed by delivery into the transmission path 403.

Meanwhile, as for the data transmitted and received by the image decoding device 402, the synch signal is detected by a synch signal detecting circuit 101 and the following signal processing is carried out on the basis of the detected synch signal.

Figure 2:
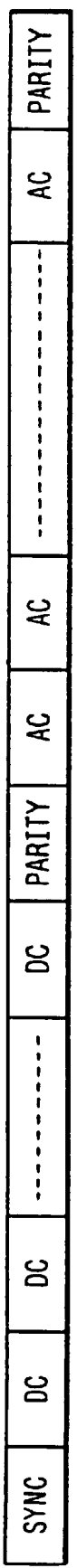
FIG. 2 is a diagram showing one example of a data transmission format.

The transmitted data is first separated by a separation circuit 102 into encoded data corresponding to the DC component and encoded data corresponding to the AC component. At this time, the format of the encoded data is selected such that the DC components and the AC components are positively separated from each other in one synch block, for example, as shown in FIG. 2.

The respective separated data are then inputted to ECC decoding circuits 103, 104 for detection and correction of the error caused during transmission. The ECC decoding circuits 103, 104 deliver the corrected data to decoding circuits 105, 106 and, simultaneously, deliver error information to a DC replacement circuit 108 depending on the respective correction results.

The respective encoded data corresponding to the DC component and the AC component after the correction processing are inputted to the decoding circuits 105, 106 and then subjected to decoding processing for restoration into information of the DC component and the AC component. If any error still remains in the encoded data, the correct information cannot be of course restored.

In the case of using variable-length encoding, for example, as an encoding method for the AC component, it may happen that the decoded value of the AC component does not become a true value and, besides, even the number of data is not restored.

The respective decoded data outputted from the decoding circuits 105, 106 are transformed by an inverse orthogonal transform circuit 107 from values indicating the frequency components into data indicating a pixel value in the block. However, if the error cannot be completely corrected by the ECC decoding circuits 103, 104 as mentioned before, the input value to the inverse orthogonal transform circuit 107 is not in itself correct information and thus an output value of the inverse orthogonal transform circuit 107 will be data quite different from the correct pixel data.

Therefore, when the error information produced from the ECC decoding circuit 103 indicates that no error is present in the DC components for the relevant block, and the error information produced from the ECC decoding circuit 104 indicates that the correction impossible error is present in the AC components for the relevant block, a DC replacement circuit 108 replaces all the pixel values in the relevant block by the respective values given by the DC components.

With the above replacing operation, even if the correction impossible error still remains as mentioned above, each pixel value in the block is given by the value of the DC component which is representative of an average value, meaning that the data can be restored to a value, though not exactly the same as the true value, relatively close to the true value.

The respective data are rearranged by a time base transform circuit 109 to line up on the same time base as for the video signal inputted to the encoding device, followed by delivery from an output terminal 110. The output terminal 110 is connected to a monitor, printer or the like for forming an image.

According to the image decoding device thus arranged, even if the correction impossible error occurs on the transmission path, a deterioration of image quality is minimized.

(Second Embodiment)

Figure 3:
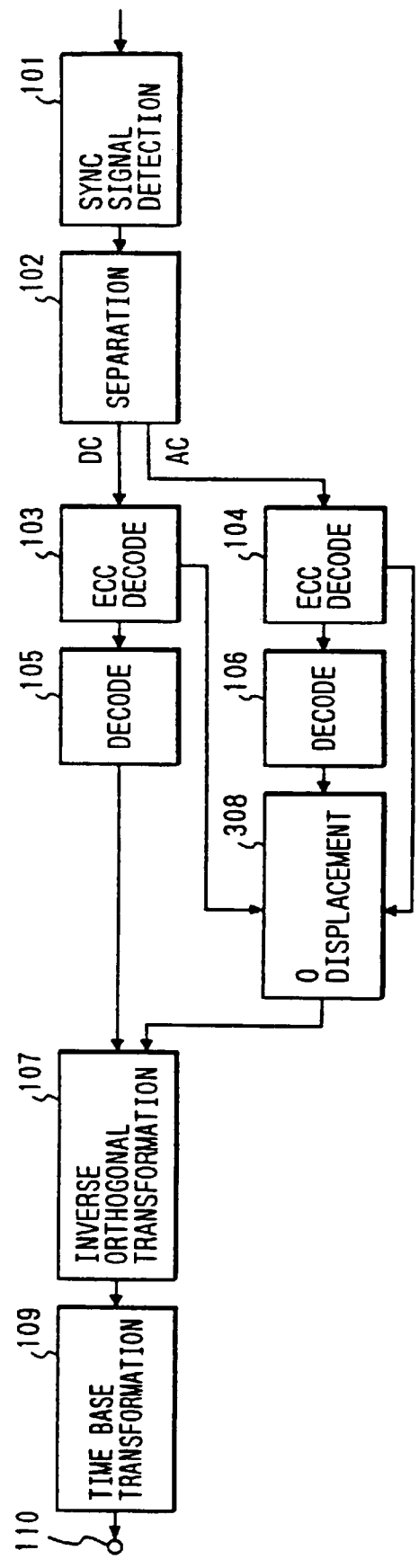
FIG. 3 is a block diagram showing a configuration of a second embodiment of the present invention.

FIG. 3 shows a second embodiment of the present invention.

In the second embodiment of FIG. 3, the function effected by the DC replacement circuit 108 in FIG. 1 is realized by a 0 replacement circuit 308. The other circuit blocks are the same as those in FIG. 1 and, therefore, are denoted at the same reference numerals.

When the respective error information outputted from the ECC decoding circuits 103, 104 indicate that no error is present in the DC components for the relevant block and the correction impossible error is present in the AC components for the relevant block, as with the above first embodiment, the 0 replacement circuit 308 replaces all the values of the AC components. With that replacing operation, the respective data inputted to the inverse orthogonal transform circuit 107 have their AC components set equal to 0. Consequently, the inverse orthogonal transform circuit 107 outputs the transformed data such that all the pixel values in the relevant block are given by the respective values of the DC component, with the result of the similar advantage to the foregoing first embodiment.

(Third Embodiment)

Figure 4:
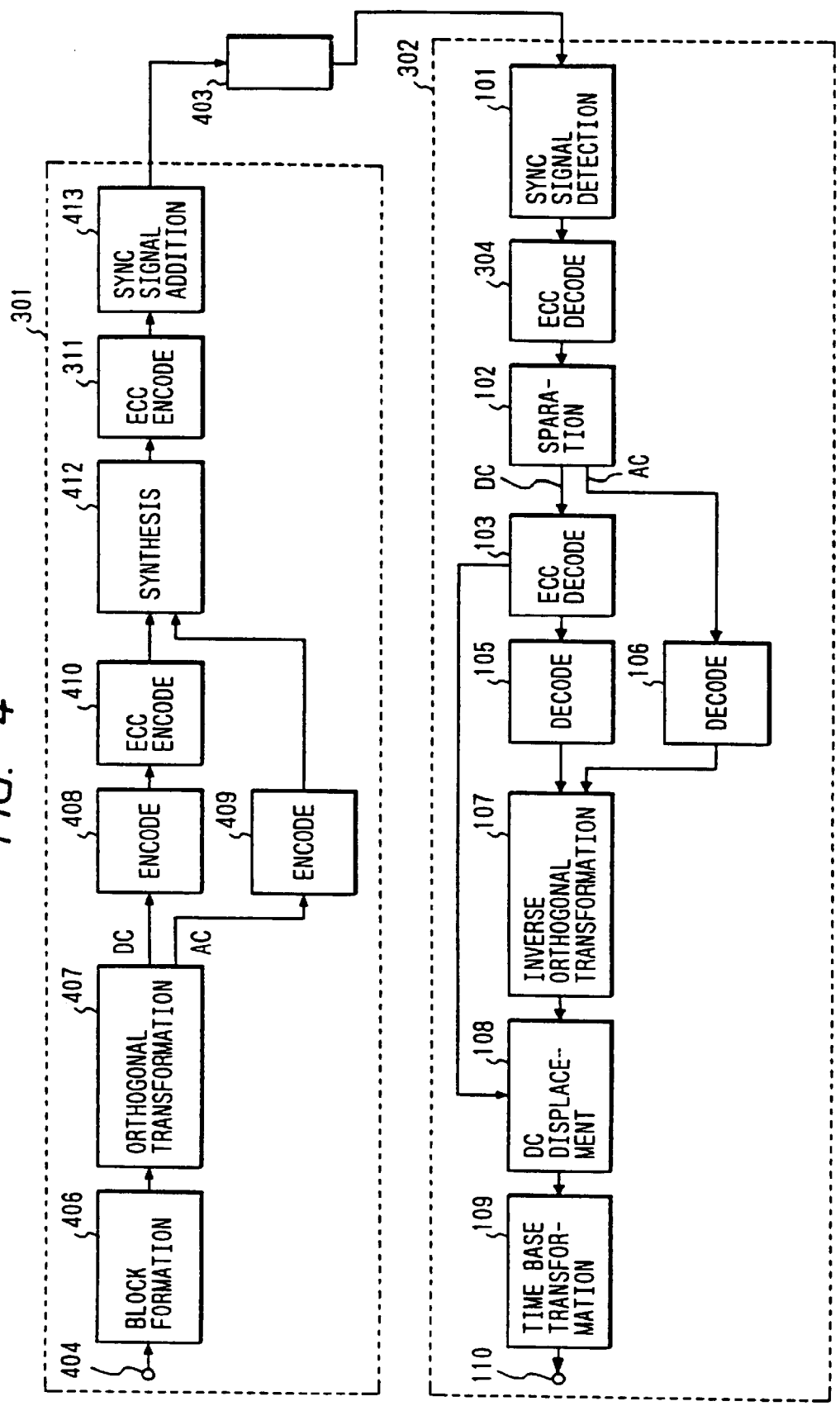
FIG. 4 is a block diagram showing a configuration of a third embodiment of the present invention.

FIG. 4 shows an example indicating the fact that the present invention is also applicable to a different method of arranging the error detecting and correcting codes.

In this embodiment, the ECC decoding circuit 104 in the decoding device of FIG. 1 and the ECC encoding circuit 411 in the encoding device of FIG. 1 are located upstream of the separation circuit 102 and downstream of the synthesis circuit 412, respectively, as an ECC decoding circuit 304 and an ECC encoding circuit 311. The error detecting and correcting codes are formed for the data resulted from synthesizing the DC component and the AC component.

In this case, the error information outputted from the ECC decoding circuit 304 indicates that an error is present in the transmitted data, and the error information outputted from the ECC decoding circuit 103 indicates that no error is present in the DC components, this means that replacement of the AC component by the DC component is effective. Thus, the replacement can be performed by the same DC replacement circuit 108 as that in FIG. 1.

According to the above first to third embodiment of the present invention, as described above, by using means for detecting and correcting an error caused during transmission or in reproduction from a recording medium, and means for replacing all the decoded data in the relevant block by respective values given by DC components based on error information produced from the detecting and correcting means, or other means identical to the latter means, it is possible to minimize a deterioration of image quality even if a correction impossible error occurs, and also realize an image decoding device which requires the small amount of hardware to be added.

Especially, in the above embodiments, a frequency transform coefficient due to the orthogonal transform is encoded using the DC component and the AC component in separate fashion. Therefore, when an error in the AC component cannot be corrected, the DC component can be used for error correction.

According to the above embodiment of the present invention, deterioration of an image quality of the image decoding device can be reduced.

(Fourth Embodiment)

An image processing apparatus according to a fourth embodiment of the present invention, described below, includes means for generating error detected information when a predetermined dynamic range of conversion coefficients is exceeded, and means for correcting the data falsely decoded, therey solving the problem as set forth above.

Figure 6:
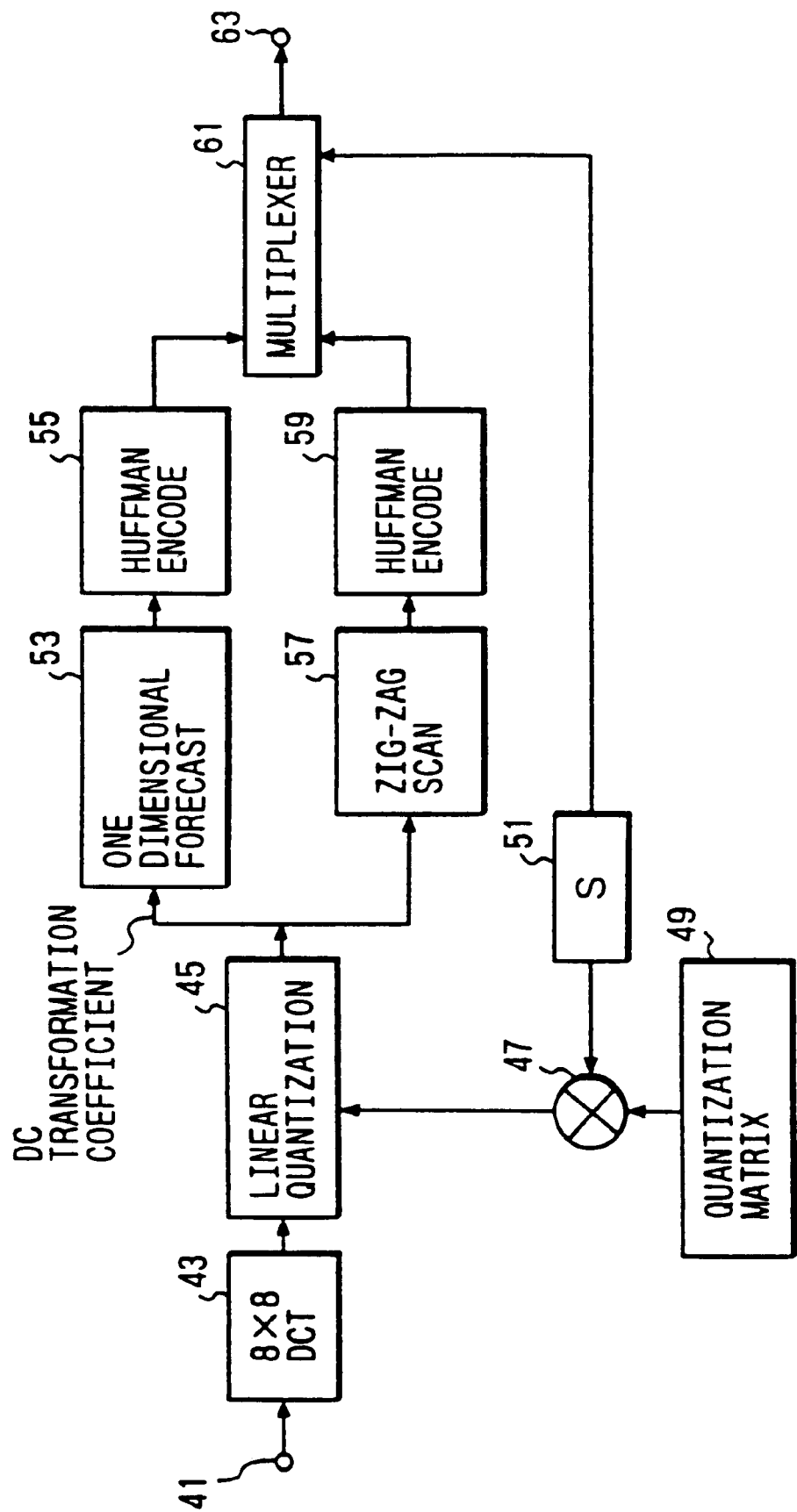
FIG. 6 is a block diagram showing an encoding device in the fourth embodiment.

FIG. 6 is a block diagram showing this embodiment.

In FIG. 6, image data applied to an input terminal 41 is delivered to a discrete cosine transform (referred to as a DCT) unit 43 and subjected to a two-dimensional DCT for each block of 8×8 pixels. In this case, for example, it is supposed that a transform coefficient of 12 bits is obtained for image data of 8 bits.

After performing the two-dimensional DCT, the transform coefficient is linearly quantized by a quantizer 45. The quantization step size is different for each transform coefficient. The quantization step sizes for the respective transform coefficients are given as values resulted by multiplying quantization coefficients generated from a quantization matrix unit 49 and shown in Table 2 below; for example, by $2^S$. Here, S is called a scaling factor and outputted to not only a multiplier 47 but also a multiplexer 61. The multiplier 47 multiplies an output of the quantization matrix unit 49 by $2^S$ and delivers the resulting coefficient to the quantizer 45. Thus, image quality and the number of data generated are controlled depending on a value of S. Specifically, with the scaling factor S increasing, the amount of data is reduced but image quality deteriorates. With the scaling factor S decreasing, the amount of data is enlarged but image quality ameliorates.

TABLE 2

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

As regards to a DC component of the orthogonal transform coefficient quantized by the quantizer 45, a one-dimensional forecaster 53 makes forecast and a resulting forecast error is Huffman-encoded by a Huffman encoder 55 and then outputted to the multiplexer 61. The Huffman encoder 55 divides outputs of the forecast errors into 16 groups as shown in Table 3 below, for example. The identification (ID) number SSSS of the group to which the forecast error belongs is first Huffman-encoded and then expressed by an equi-length code indicating any value in the relevant group. In the case of Table 3, the code length of the equi-length code is equal to the value of the group ID number SSSS.

TABLE 3

| Forecast Error of DC Transform after Quantization | Group ID Number SSSS |
|---|---|
| 0 | 0 |
| −1,1 | 1 |
| −3, −2,2,3 | 2 |
| −7~−4,4~7 | 3 |
| −15~−8,8~15 | 4 |
| −31~−16,16~31 | 5 |
| −65~−32,32~65 | 6 |
| −127~−64,64~127 | 7 |
| −255~−128,128~255 | 8 |
| −511~−256,256~511 | 9 |
| −1023~−512,512~1023 | 10 |

TABLE 3-continued

| Forecast Error of DC Transform after Quantization | Group ID Number SSSS |
|---|---|
| −2047~−1024,1024~2047 | 11 |
| −4095~−2048,2048~4095 | 12 |
| −8191~−4096,4096~8191 | 13 |
| −16383~−8192,8192~16383 | 14 |
| −32767~−16384,16384~32767 | 15 |

Figure 7:
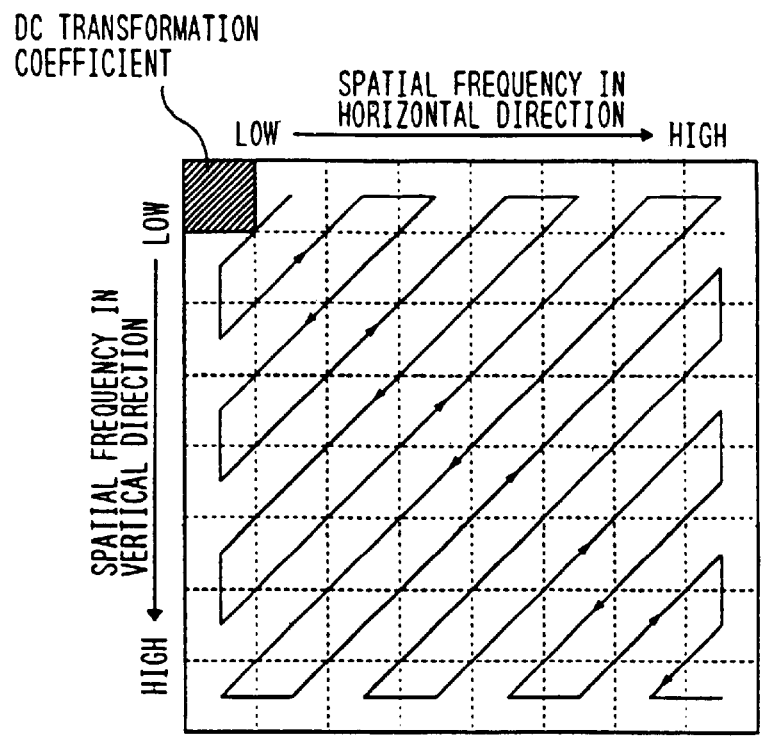
FIG. 7 is a diagram for explaining a zig-zag scanner 57 in FIG. 5.

As for an AC component of the orthogonal transform coefficient except for the DC component, the output of the quantizer 45 is outputted to a zig-zag scanner 57. The zig-zag scanner 57 performs zig-zag scan from a low-frequency component to a high-frequency component as shown in FIG. 7. Thereafter, an output of the zig-zag scanner 57 is delivered to a Huffman encoder 59.

The Huffman encoder 59 divides the transform coefficients, which have the quantization results other than 0 (hereinafter referred to as significant coefficients), into 15 groups depending on their values and sets the group ID number as SSSS, as shown in Table 4 below. The number of the transform. coefficients, which are sandwiched between the preceding and succeeding significant coefficients and have the quantization results equal to 0 (hereinafter referred to as insignificant coefficients), is set as a run length NNNN. Then, the group ID number SSSS and the run length NNNN are combined into a set, as shown in Table 5, followed by the Huffman encoding. Subsequently, the ID number SSSS is expressed by an equi-length code indicating any value in the relevant group shown in Table 4.

TABLE 4

| Quantization Output Level of AC Orthogonal Transform Coeff. | Group ID Number SSSS |
|---|---|
| −1,1 | 1 |
| −3,−2,2,3 | 2 |
| −7~−4,4~7 | 3 |
| −15~−8,8~15 | 4 |
| −31~−16,16~31 | 5 |
| −65~−32,32~65 | 6 |
| −127~−64,64~127 | 7 |
| −255~−128,128~255 | 8 |
| −511~−256,256~511 | 9 |
| −1023~−512,512~1023 | 10 |
| −2047~−1024,1024~2047 | 11 |
| −4095~−2048,2048~4095 | 12 |
| −8191~−4096,4096~8191 | 13 |
| −16383~−8192,8192~16383 | 14 |
| −32767~−16384,16384~32767 | 15 |

In the case of Table 4, the code length of the equi-length code is equal to the value of the group ID number SSSS. The case that the value of the run length NNNN exceeds 16 is dealt with by sending a code of R16 shown in Table 5 and repeatedly subtracting 15 from the run length NNNN until the remainder becomes equal to or less than 15. When all the significant coefficients in the block are completely encoded, a code of EOB (End of Block) in Table 5 is finally sent.

TABLE 5

| | | Group ID Number SSSS | |
|---|---|---|---|
| | | 0 | 1 2 ........ 14 15 |
| Run Length NNNN | 0 | EOB | Huffman code for combination of NNNN and SSSS |
| | 1 | no use | |
| | 2 | | |
| | . | | |
| | . | | |
| | . | | |
| | 14 | | |
| | 15 | R16 | |

The multiplexer 61 multiplexes the Huffman-encoded data of the DC component and the Huffman-encoded data of the AC component, followed by delivery to an output terminal 63 after adding the scaling factor S thereto.

Figure 5:
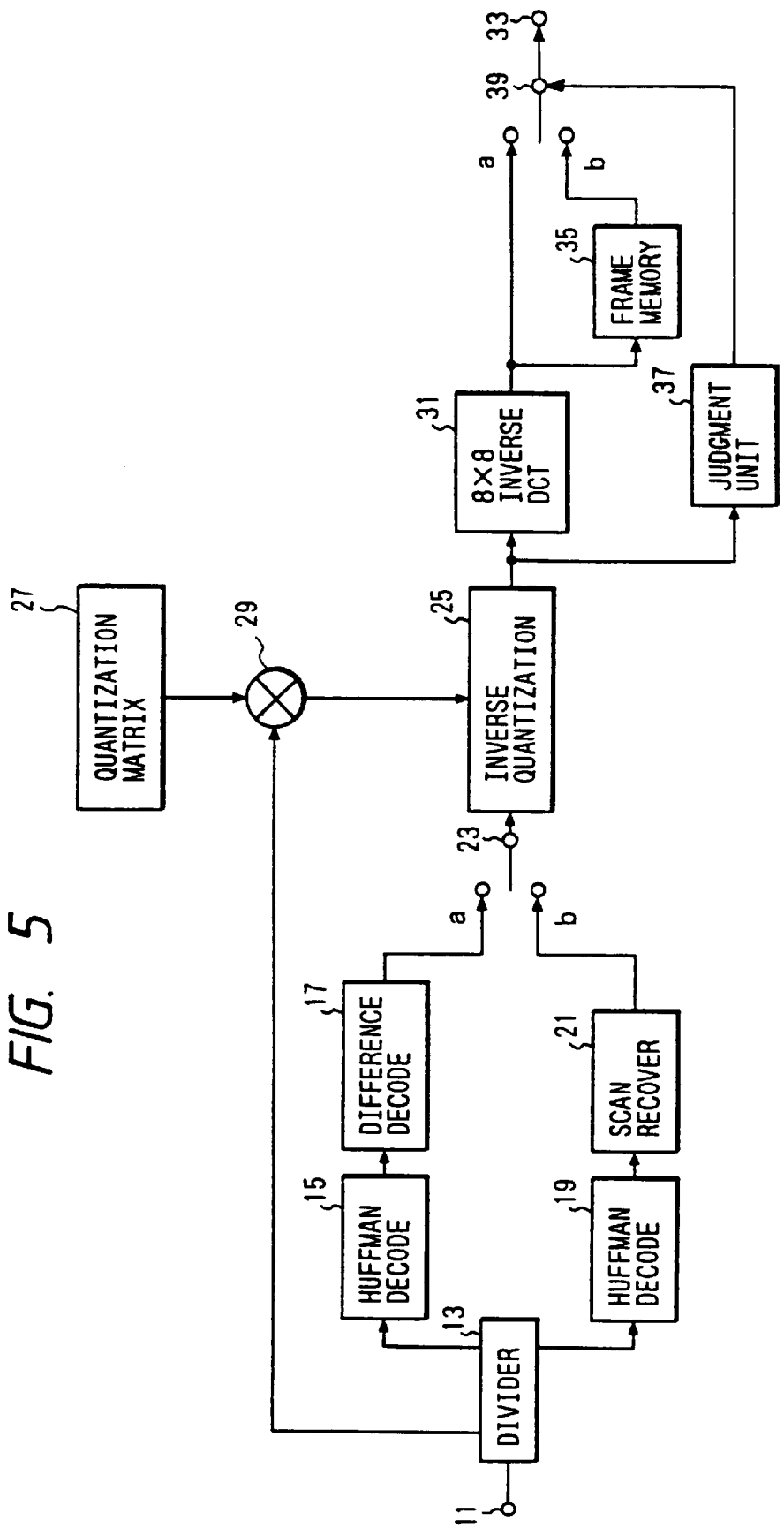
FIG. 5 is a block diagram showing a configuration of a decoding device in a fourth embodiment of the present invention.

FIG. 5 shows a block diagram a decoding device in cooperation with the encoding device of FIG. 4.

The transmitted data is inputted to an XO terminal 11 and delivered to a divider 13. The divider 13 outputs the scaling factor S to a multiplier 29, the DC component data to a Huffman decoder 15, and the AC component data to a Huffman decoder 19. The Huffman decoder 15 decodes a series of Huffman codes to difference values and then outputs-them to a difference decoder 17. The difference decoder 17 restores each difference value to the transform coefficient of the DC component and then outputs it to a terminal a of a switch 23.

Figure 8:
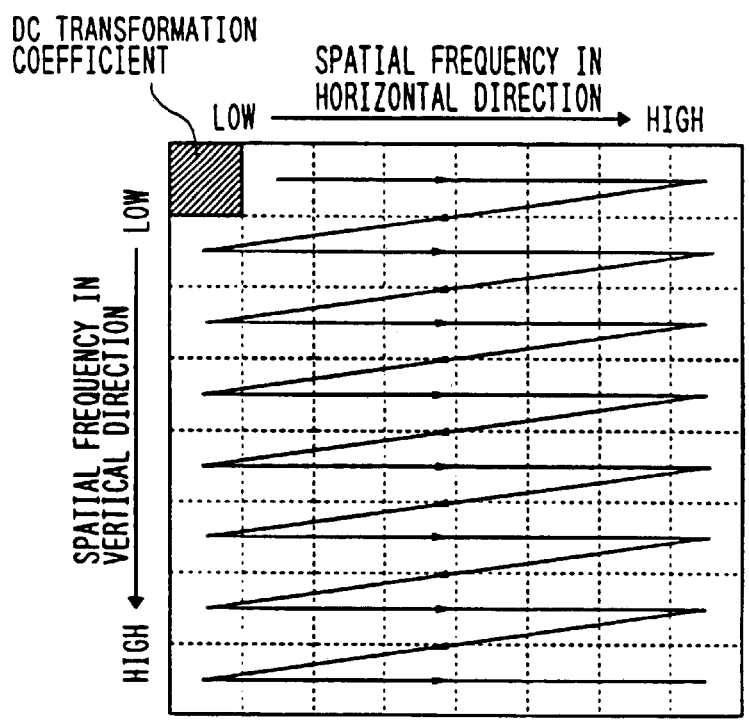
FIG. 8 is a diagram for explaining a scan recovery unit 21 in FIG. 5.

On the other hand, the Huffman-encoded data of the AC component is restored by the Huffman decoder 19 to the transform coefficient of the AC component. After that, the restored transform coefficient is reverted by a scan recovery unit 21 from the zig-zag scan series to a data series as shown in FIG. 8, followed by delivery to a terminal b of the switch 23. Thus, both the transform coefficients of the DC component and the AC component are multiplexed as shown in FIG. 8 through the switch 23.

The multiplexer 29 multiplies the matrix produced from a quantization matrix unit 27 by $2^{-S}$ and outputs the resulting products to an inverse quantizer 25. The transform coefficients of 8×8 are inversely quantized by the inverse quantizer 25 and outputted to an inverse discrete cosine transform unit 31 for restoring to the image data of 8 bits.

While the transform coefficient inversely quantized by the inverse quantizer 25 is outputted to the inverse discrete cosine transform unit 31, it is also outputted to a judgment unit 37. The image data restored by the inverse discrete cosine transform unit 31 is outputted to not only a terminal a of a switch 39 but also a frame memory 35. The frame memory 35 delays the image data by a time period of one frame and then outputs the delayed data to a terminal b of the switch 39 for the purpose of using it as correction data when an error is detected.

The judgment unit 37 compares the transform coefficient with a predetermined dynamic range and outputs the judgment result to the switch 39.

Assuming now that the dynamic range of transform coefficients is 12-bit, for example, if the transform coefficient exceeds 12 bits, this leads to a judgment that an error has occurred in the transmission path. When the result of the judgment unit 37 judges the occurrence of an error, the switch 39 is changed over for connection to the terminal b so that the current image data is replaced by the image data at the same location of preceding one frame. When the judgment reveals the presence of no error, the switch 39 is changed over for connection to the terminal a. The image data whose error has been corrected through the switch 39 is delivered to an output terminal 33.

It is needless to say that although this embodiment makes a correction using a group of pixels of preceding one frame, the correction may performed by using another group of surrounding pixels which has high correlation. In this case, the frame memory 35 for storing the image data of preceding one frame can be dispensed with and, as a result, the circuit configuration is simplified.

Further, although-the above judgment has been made by using the frequency component before transform into the actual space, the image data after being restored to the real space through the inverse DCT may be instead used.

The above judgment is performed for each pixel and, if an error is found in at least one component in the block, the entire block is replaced by the image data of the preceding frame. Alternatively plural blocks or an entirety of one picture may be replaced.

In addition, the orthogonal transform is not limited to the DCT and may be any other suitable one such as an Adamar transform.

In place of Huffman encoding, other multi-value data encoding, arithmetic encoding or the like may also be used.

With this embodiment thus arranged, since there are provided error detecting means specific to the decoding process and error correcting means, image quality can be simply prevented from deteriorating when an error occurs.

As explained above, according to the fourth embodiment of the present invention, it is possible to prevent a deterioration of image quality otherwise caused by the occurrence of an error, and reproduce good image quality.

(Fifth Embodiment)

Figures 9, 10:
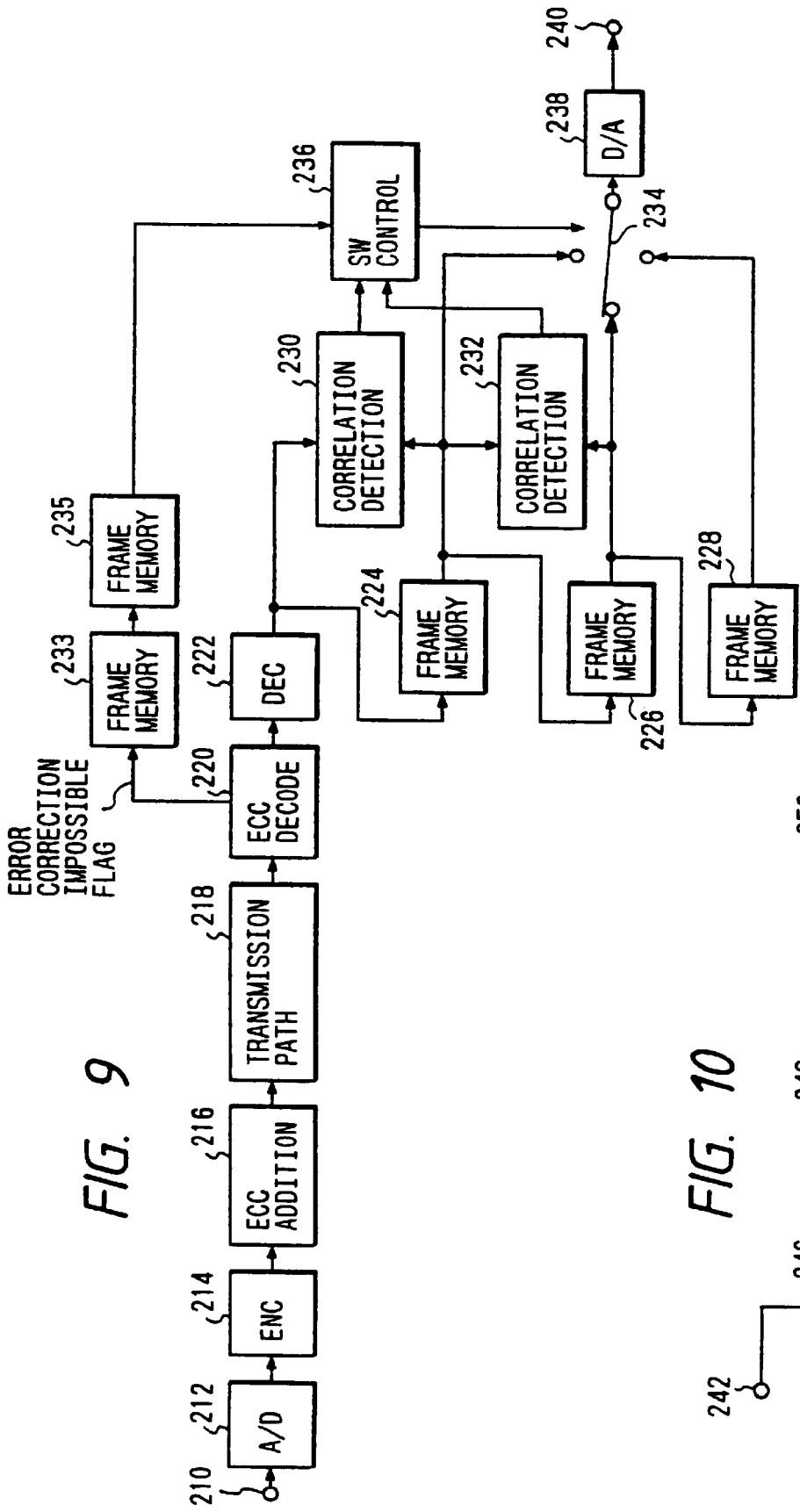
FIG. 9 is a block diagram showing a configuration of a fifth embodiment of the present invention.
FIG. 10 is a circuit diagram of each of correlation detecting circuits 230, 232.

FIG. 9 illustrates a block diagram showing a configuration of a fifth embodiment of the present invention. Denoted at 210 is an-input terminal for an analog image signal, 212 is an A/D converter for converting the analog image signal into a digital image signal, 214 is an encoder for encoding the digital image signal with high efficiency, and 216 is an ECC (error detecting and correcting code) addition circuit for adding an ECC so as to detect and correct a transmission error which may be caused in a recording/reproducing system such as a magnetic tape or optical disk, a communication/transmission system such as an optical fiber or communication satellite, etc. 218 is a transmission path which is practically in the form of a recording/reproducing system such as a magnetic tape or optical disk, or a communication/transmission system such as an optical fiber or communication satellite.

Denoted at 220 is an ECC decoding circuit corresponding to the ECC addition circuit 216, and 222 is a decoder corresponding to the encoder 214. The ECC decoding circuit 220 outputs the error corrected data to the decoder 222 and outputs an error correction impossible signal (flag) for the data including an error which cannot be corrected. The error correction impossible signal (flag) is delayed through frame memories 233, 235 by a time period of two-frames and then supplied to a switch control circuit 236 described later 224, 226, 228 are frame memories serially interconnected and each comprising an FIFO (first-in first-out)-memory. 230 is a correlation detecting circuit-for detecting correlation between an output of the decoder 222 and an output of the frame memory 224, i.e., interframe correlation, whereas 230 is a correlation detecting circuit for detecting interframe correlation between outputs of the frame memories 224 and 226. 234 is a switch for selecting any one of the outputs of the frame memories 224, 226, 228. Depending on the error correction impossible flag from the ECC decoding circuit 220 and the detection results of the correlation detecting circuits 230, 232, the switch control circuit 236 changes over the switch 234. 238 is a D/A converter for converting the data selected by the switch 234 into an analog signal, and 240 is an output terminal for the reproduced analog image signal.

FIG. 10 shows an exemplified circuit configuration of each of the correlation detecting circuit 230, 232. 242, 244 are input terminals for respective image data, and 246 is a subtracter for calculating the difference between the two image data applied from the input terminals 242, 244. 248 is an adder and 250 is a D flip-flop for feeding an output of the adder, 248, back to the adder 248 while delaying it by a time period of one sample. The adder 248 and the D flip-flop 250 cooperate to constitute an accumulator. An output of the adder 248 resulted from adding the current output of the subtracter 246 and the preceding one-frame output thereof is delivered from an output terminal 252.

Operation of this embodiment shown in FIG. 9 will now be described. The A/D converter 212 samples the analog image signal, applied to the input terminal 210, at a predetermined sampling rate for converting it into a digital signal of 8 bits or 16 bits. The encoder 214 compresses the digital image signal outputted from the A/D converter 212, namely, encodes the digital image signal with high efficiency through DPCM encoding or ADCT encoding. This embodiment is not restricted by the type of high-efficient encoding itself. The ECC addition circuit 216 adds the error detecting and correcting code in accordance with a predetermined method.

The output of the ECC addition circuit 216 is inputted to the ECC decoding circuit 220 via the transmission path 218 in the form of a recording/reproducing system or communication/transmission system. During-transmission through the transmission path 218, there occurs a transmission-error at certain probability. The ECC decoding circuit 220 checks the data inputted from the transmission path 218 for detecting the presence or absence of an error, the position of the error, and whether the error can be corrected or not, followed by delivery to the decoder 222 after correcting the correction possible error. When the correction impossible error is found, the error correction impossibe flag is outputted to the switch control circuit 236.

The decoder 222 decodes (expands) the data compressed by the encoder 214 and outputs the original image data to both the frame memory 224 and the correlation detecting circuit 230. Since the frame memories 224, 226, 228 are operated in an FIFO manner and cascaded to each other, the image data of successive three frames are sequentially stored in the frame memories 224, 226, 228. The correlation detecting circuit 230 detects correlation between the current frame (the output of the decoder 222) and the frame preceding one (the output of the frame memory 224), whereas the correlation detecting circuit 232 detects correlation between the frame preceding one (the output of the frame memory 224) and the frame preceding two (the output of the frame memory 226) with respect to the current frame (the output of the decoder 222). The correlation detecting circuits 230, 232 each store one frame of differences between the corresponding image signals of two frames inputted thereto, and determines a degree of correlation between the two frames.

The switch 234 can select any one of the outputs from the frame memories 224, 226, 228 and normally selects the output of the frame memory 226. The switch control circuit 236 can find the position of the correction impossible error over the picture based on the error correction impossible flag from the ECC decoding circuit 220, and also find which one of the preceding picture and the succeeding picture has a higher degree of correlation with respect to the output picture of the frame memory 226, based on the outputs from the correlation detecting circuits 230, 232. Stated otherwise, in response to the error correction impossible flag from the ECC decoding circuit 220, the switch control circuit 236 changes over the switch 234 to thereby select the image data at the same position on the picture which has a higher degree of correlation.

The D/A converter 238 converts the image data outputted from the switch 234 into an analog signal, following which the reproduced analog image signal is outputted from the output terminal 240.

(Sixth Embodiment)

Figure 11:
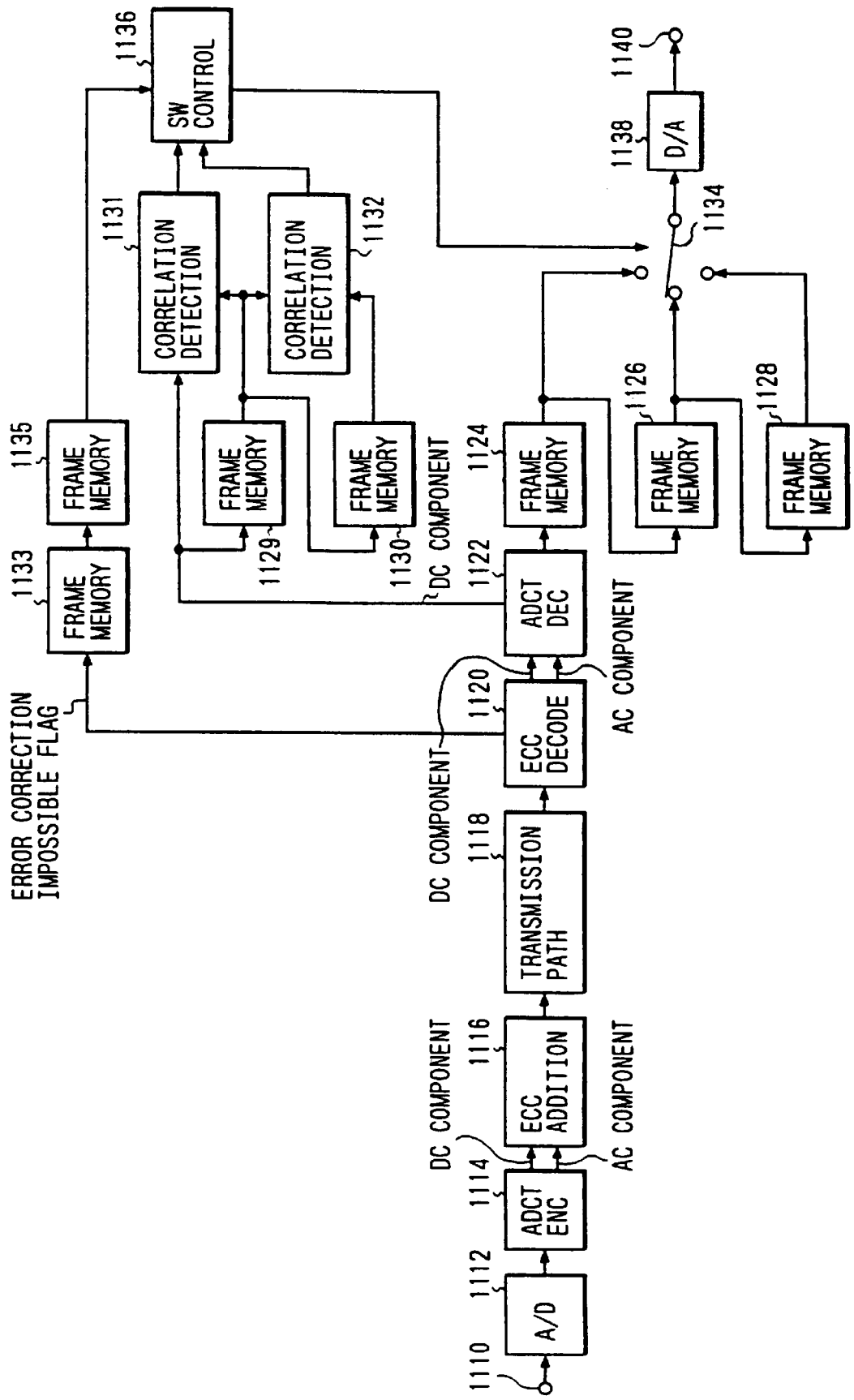
FIG. 11 is a block diagram showing a configuration of a sixth embodiment of the present invention.

FIG. 11 illustrates a block diagram showing a configuration of a sixth embodiment of the present invention. This embodiment adopts an ADCT method as a high-efficient encoding method.

Denoted at 1110 is an input terminal for an analog image signal, 1112 is an A/D converter, and 1114 is an encoder of ADCT type. The encoder 1114 separates the input data into a DC component and an AC component through a DCT transform made for each DCT block, e.g., 8×8 pixels, performs DPCM encoding on the DC component between the current DCT block and the preceding DCT block, and simultaneously performs run-length processing and Huffman encoding on the AC component. 1116 is an ECC (error detecting and correcting code) addition circuit for adding an ECC to the respective encoded outputs of the AC component and the DC component from the ADCT encoder 1114.

1118 is a transmission path or system, 1120 is an ECC decoding circuit corresponding to the ECC addition circuit 1116, and 1122 is an ADCT decoder corresponding to the ADCT encoder 1114. 1124, 1126, 1128 are frame memories serially interconnected and each comprising an FIFO (first-in first-out) memory. 1129, 1130 are frame memories of FIFO type for delaying the DC component outputted from the ADCT decoder 1122 by a time period of one frame, and are cascaded for detecting correlation. 1131 is a correlation detecting circuit for detecting interframe correlation between an output of the decoder 1122 and an output of a frame memory 1129, whereas 1132 is a correlation detecting circuit for detecting interframe correlation between outputs of the frame memories 1129 and 1130. 1134 is a switch for selecting any one of the outputs of the frame memories 1124, 1126, 1128. Depending on the error correction impossible flag from the ECC decoding circuit 1120 and the detection results of the correlation detecting circuits 1131, 1132, a switch control circuit 1136 changes over the switch 1134. 1138 is a D/A converter for converting the data selected by the switch 1134 into an analog signal, and 1140 is an output terminal for the reproduced analog image signal.

Specific operation of this embodiment shown in FIG. 11 will now be described. The A/D converter 1112 converts the analog image signal, applied to the input terminal 1110, into a digital signal. The ADCT encoder 1114 carries out a DCT transform on the digital image signal outputted from the A/D converter 1112 for each DCT block such that the DC component is subjected to DPCM encoding between the current DCT block and the preceding DCT block, and the AC component is subjected to run-length processing and Huffman encoding. The ECC addition circuit 1116 adds an ECC to the AC component output and the DC component output from the ADCT encoder 1114.

The output of the ECC addition circuit 1116 is inputted to the ECC decoding circuit 1120 via the transmission path 1118. The ECC decoding circuit 1120 checks the respective AC and DC component data inputted from the transmission path 1118 for detecting the presence or absence of an error, the position of the error, and whether the error can be corrected or not, followed by delivery to the ADCT decoder 1122 after correcting the correction possible error. When the correction impossible error is found, an error correction impossible flag is delayed through frame memories 1133, 1135 by a time period of two frames and then supplied to the switch control circuit 1136.

The ADCT decoder 1122 performs DPCM decoding on the DC component and both Huffman decoding and run-length decoding on the AC component, followed by an inverse DCT transform for restoring to the original image data. The image data restored by the ADCT decoder 1122 is applied to the frame memory 1124, whereas the DC component before the inverse DCT transform is applied to both the frame memory 1129 and the correlation detecting circuit 1131 for the DC component. As with the frame memories 224, 226, 228 in FIG. 10, the frame memories 1124, 1126, 1128 respectively store the image data of successive three frames in a sequential manner. The frame memories 1129, 1130 are also cascaded to store the DC components of adjacent two frames on a frame-by-frame basis. As for the DC component, the correlation detecting circuit 1131 detects correlation between the current frame (the output of the decoder 1122) and the frame preceding one (the output of the frame memory 1129), whereas the correlation detecting circuit 1132 detects correlation between the frame preceding one (the output of the frame memory 1129) and the frame preceding two (the output of the frame memory 1130) with respect to the current frame. The correlation detecting circuits 1131, 1132 may be the same circuit configuration as that shown in FIG. 10, and each store one frame of differences in the DC component between the corresponding image signals of two frames inputted thereto. Thus, a degree of correlation between the two frames can be determined.

The switch 1134 can select any one of the outputs from the frame memories 1124, 1126, 1128 and normally selects the output of the frame memory 1126. The switch control circuit 1136 controls the switch 1134 in a like manner to the switch control circuit 236 shown in FIG. 9. Specifically, for the error correction impossible data, the switch control circuit 1136 enables to select the image data at the same position on the picture which has a higher degree of correlation. The D/A converter 1138 converts the image data outputted from the switch 1134 into an analog signal, following which the reproduced analog image signal is outputted from the output terminal 1140.

With this embodiment shown in FIG. 11, since correlation is detected by using the DC component, correlation detection can be performed more correctly and, therefore, interpolation can be performed in a more natural manner.

While the illustrated embodiment include the correlation detecting circuits disposed on the decoder side (or the reception side), those circuits may be disposed on the encoder side (or the transmission side) so as to transmit information of interframe correlation frame by frame. This remarkably cut down the equipment burden to be borne on the reception side. Accordingly, this modification is fit for such a transmission system that is directed to a large number of receivers like TV broadcasting and requires the small size and reduced cost of receiver units.

According to the fifth and sixth embodiments, as will be easily understood from the above description, since information of interframe correlation is used to interpolate the error correction impossible data, it is possible to make the perforation in a more natural manner and provide a reproduced image (received image) with less unnaturalness.

(Seventh Embodiment)

Figure 12:
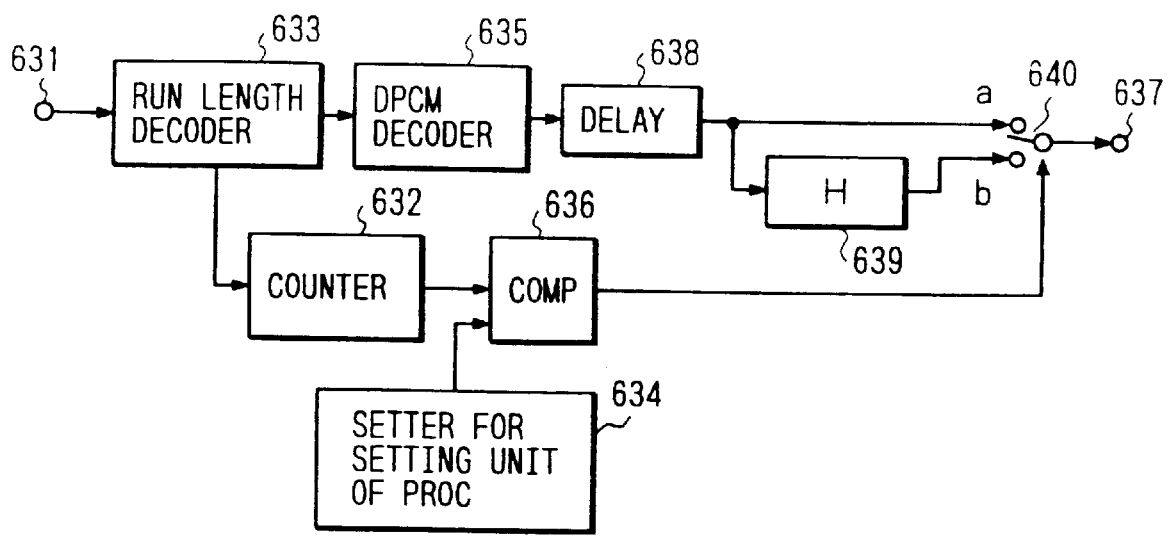
FIG. 12 is a block diagram showing a configuration of a seventh embodiment of the present invention.
Figure 13:
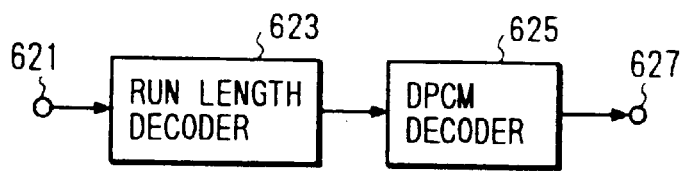
FIG. 13 is a block diagram of a conventional decoding device.
Figure 14:
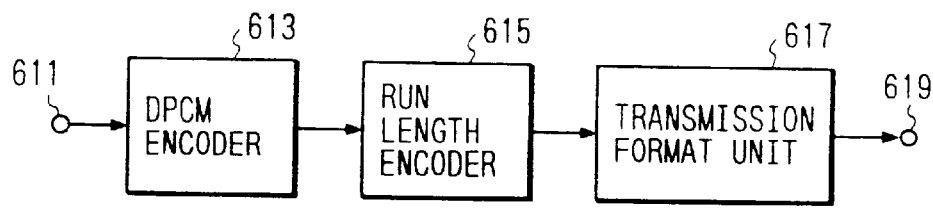
FIG. 14 is a block diagram of a conventional encoding device.
Figure 15A:
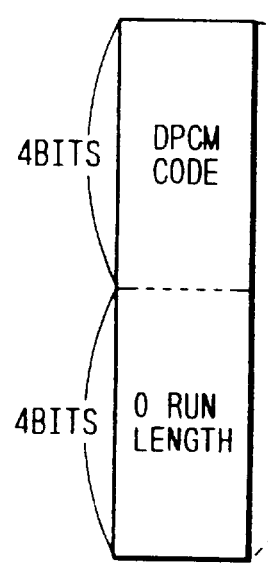
FIGS. 15A and 15B are diagrams for explaining operation of FIG. 14.
Figure 15B:
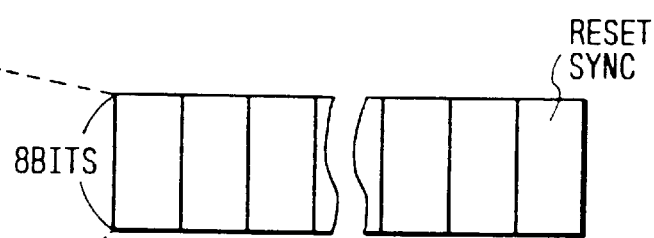

FIG. 12 is a block diagram showing a seventh embodiment of the present invention. Transmitted data applied to an input terminal 631 is decoded by a run-length decoder 633 to a DPCM code, and the 0 run-length of the data is outputted from the run-length decoder 633 to a counter 632. The counter 632 continues counting both the 0 run-length and the number of DPCM codes until arrival of a reset synch bit. In other words, the counter 632 counts the predetermined number of pixels in a processing unit. The number of pixels counted by the counter 632 is outputted to a comparator 636. The comparator 632 compares the predetermined number of pixels set by a processing unit setter 634 and the number of pixels outputted from the counter 632, thereby outputting an error flag of 1 bit to a switch 640. Stated otherwise, if both the numbers of pixels are not in match with each other, then a flag is set based on judging the presence of an error.

Meanwhile, the DPCM code decoded by the run-length decoder 633 is outputted to the DPCM decoder 635 and further decoded to image data. The image data outputted from the DPCM decoder 635 is delivered to a delay unit 638. The delay unit 638 delays the image data by a predetermined amount of delay caused in the comparator 636, to thereby match the timing between the error flag and the image data. The image data outputted from the delay unit 638 is delivered to a contact a of the switch 640 and, simultaneously, to a one-line delay unit 639 so that the same image data is delivered to a contact b of the switch 640 after being delayed by a time period of one line. When the error flag outputted from the comparator 636 indicates that no error has occurred, the switch 640 is changed over for connection to the contact a. When an error has occurred, the switch 640 is changed over for connection to the contact b so that the current image data is replaced by the image data of preceding one line for correction. In either case, the correct or corrected image data is delivered to an output terminal 637.

It is needless to say that while the above embodiment is explained as using the encoding method in combination of DPCM encoding and run-length encoding, this embodiment is applicable to all the methods that use run-length encoding, such as one in which run-length encoding is performed after orthogonal transform encoding. Also, the principles of this embodiment can be employed in any of the foregoing embodiments as well.

As described above, according to the seventh embodiment of the present invention, it is possible to prevent a deterioration of image quality otherwise caused by the occurrence of an error, by providing error detecting means specifically adapted for the process of decoding run-length codes.

(Eighth Embodiment)

Figure 17:
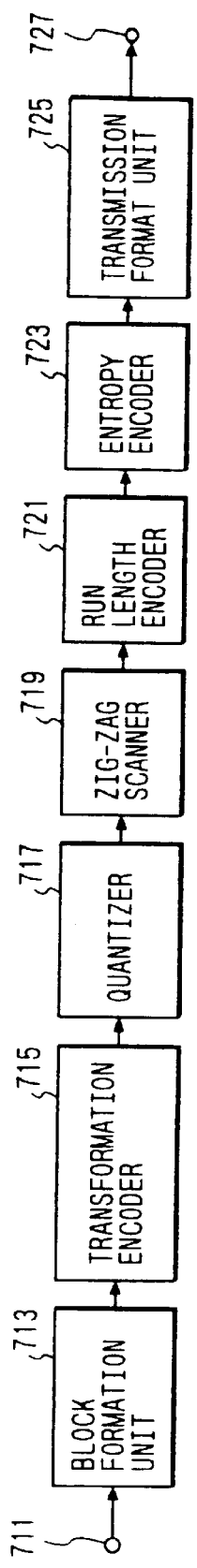
FIG. 17 is a block diagram of an encoding device.
Figures 18A, 18B:
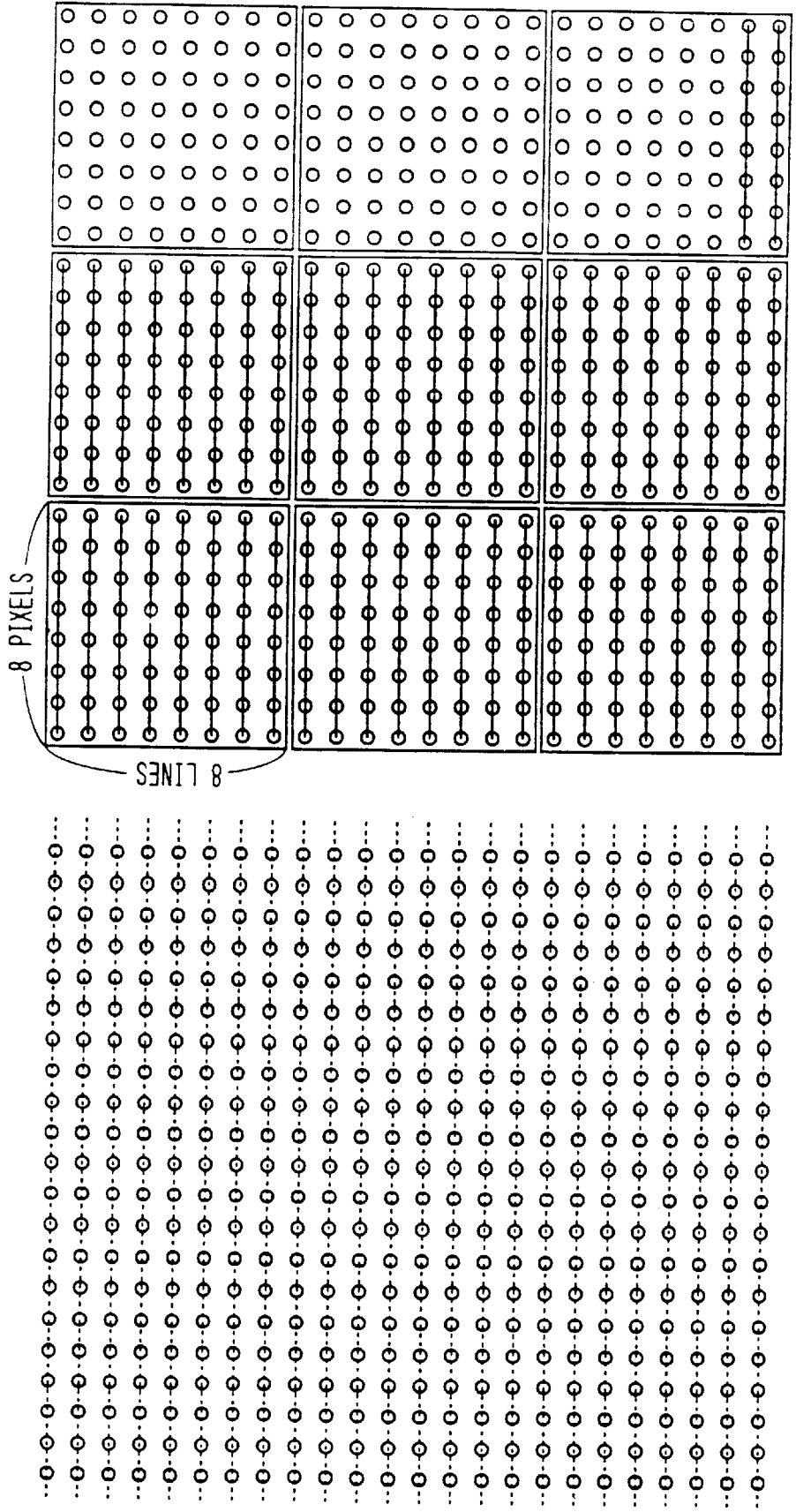
FIGS. 18A and 18B are diagrams for explaining operation of FIG. 17.

FIG. 17 is a block diagram showing an encoding method which combines two, i.e., the orthogonal transform encoding method and the run-length encoding method, with each other. Image data applied to an input terminal 711 is divided into blocks by a block formation unit 713 such that a raster series of FIG. 18A is turned into a plurality of blocks as shown in FIG. 18B. In this case, each block comprises 8 pixels horizontal and 8 pixels vertical. The pixel data in each block are transformed by a transform encoder 715. The transform encoder 715 employs a transform encoding method called a discrete cosine transform (DCT) encoding.

Figures 20, 21:
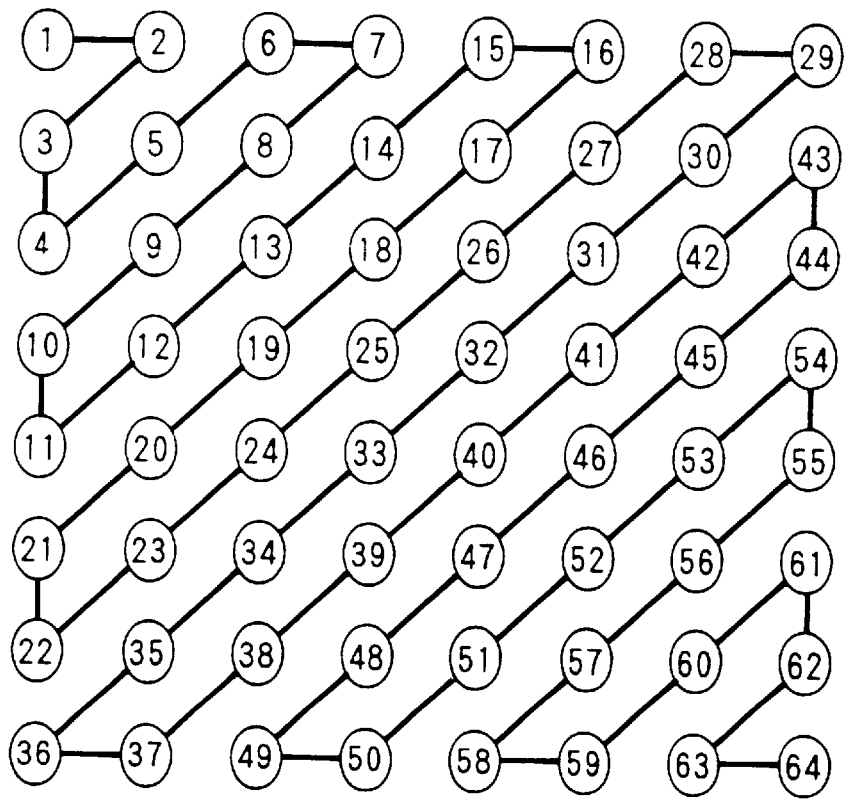

Generally, as shown in FIG. 19, the coefficients obtained through the DCT transform of the image data exhibit low resolution in the oblique direction and have the smaller magnitude at the A higher frequency component. Those coefficients obtained through the DCT transform are quantized by a quantizer 717. The quantized transform coefficients are scanned by a zig-zag scanner 717 in zig-zag fashion as shown in FIG. 20 for the reason that the probability of the occurrence of 0 is increased at the higher frequency component. Such zig-zag scan results in successive appearance of 0s. The zig-zag scanned data is applied to a run-length encoder 721 to form a set of the number of 0s and the coefficients other than 0. Upon the completion of processing of one block, an EOB code is outputted. An entropy encoder 723 assigns a short code to those codes having high occurrence probability and a long code to those codes having low occurrence probability, followed by delivery to a transmission format unit 725. The transmission format unit 725 delivers the data from an output terminal 727 after adding a synch bit for every several blocks as shown in FIG. 21.

Figure 16:
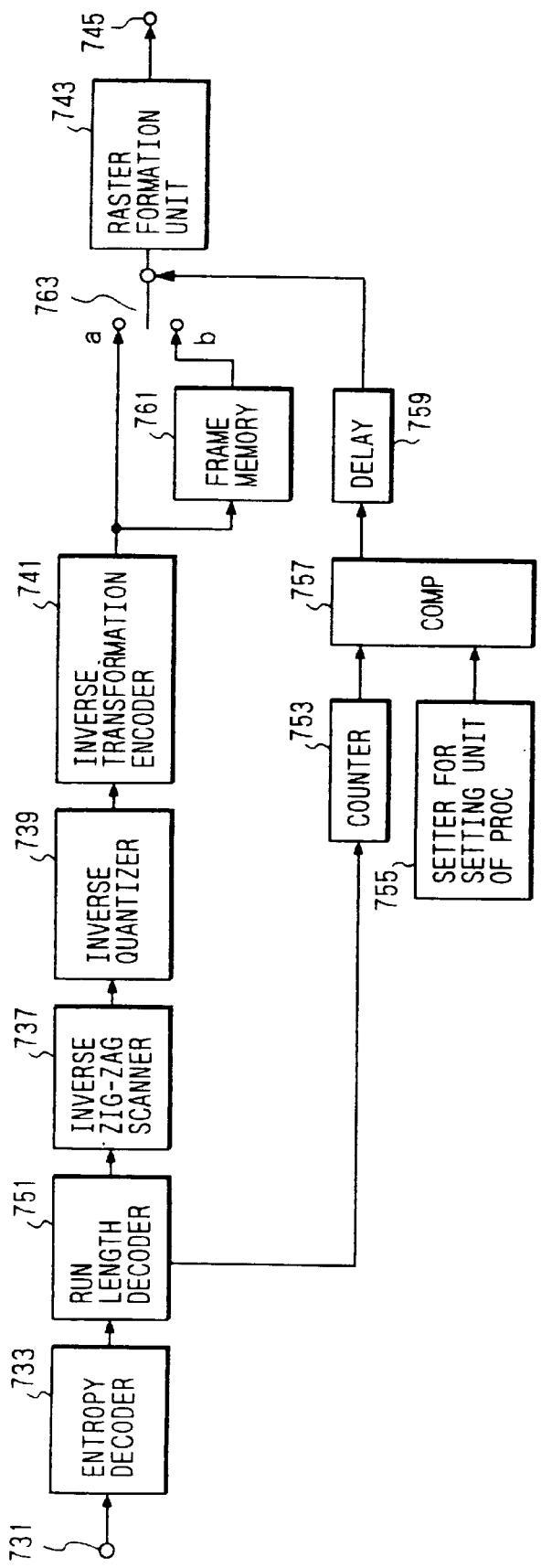
FIG. 16 is a block diagram showing a configuration of an eighth embodiment of the present invention.

FIG. 16 is a block diagram showing a configuration of a decoding device in cooperation with the encoding device of FIG. 17. The data transmitted through a transmission path is applied to an input terminal 731 and decoded by an entropy decoder 733 to a run-length code.

The run-length decoder 751 performs run-length decoding and outputs the decoded data to an inverse zig-zag scanner 737 and, simultaneously, outputs the sum of the number of 0s in a run and the number of 1s other than 0, i.e., the number of transform coefficients, to a counter 753. The counter 753 counts the number of transform coefficients for each predetermined period of time. Assuming now that the predetermined period of time is one block, a processing unfit setter 755 sets 64 equal to the number of transform coefficients. A comparator 757 compares a value inputted from the processing unit setter 755 with a value inputted from the counter 753. If both the values are in match with each other, then it is judged that the data has been transmitted without errors. If both the values are not in match with each other, then it is judged that an error has occurred. Either judgment result is outputted to a delay unit 759. The delay unit 759 delays the judgment result by the amount to be paired off by proceeding through an inverse zig-zag scanner 737, an inverse quantizer 739 and an inverse transform encoder 741.

On the other hand, the inverse transform encoder 741 outputs the inversely transformed pixel data to one terminal a of a switch 763 and also to a frame memory 761. The frame memory 761 the pixel data, which are delayed by a time period of one frame therethrough, to the other terminal b of the switch 763. Depending on the judgment result outputted from the delay unit 759, the switch 763 selects the terminal a for a predetermined period of time when no error is found, and the terminal b for a predetermined period of time when an error is found. In other words, upon the occurrence of an error, the current image data is replaced by the image data of preceding frame for correction.

A raster formation unit 743 converts the block series back into the raster series, followed by delivery to an output terminal 743.

As described above, according to the eighth embodiment of the present invention, a deterioration of image quality otherwise caused by the occurrence of an error can be prevented with a simple hardware construction, by providing error detecting means specifically adapted for the process of run-length decoding.

It should be understood that the error correction in the foregoing embodiments may be performed by using any of the image data of preceding frame and the image data of preceding field.

Furthermore, the present invention is not limited to the foregoing embodiments and can be variously modified and applied within a scope defined by the attached claims.

Additionally, any combinations of the foregoing embodiments are covered by the principles of the present invention.

What is claimed is:

1. An image processing apparatus for concealing moving image data transmitted from a transmission apparatus, comprising:

a receiver arranged to receive moving image data composed of a plurality of successive pictures, error correction check codes, and correlation information indicating correlations between the plurality of successive pictures of the moving image data through a transmission path, the correlation information having been generated by the transmission apparatus by detecting the correlations between the plurality of successive pictures of the moving image data and transmitted with the moving image data and the error correction check codes from the transmission apparatus through the transmission path;

an error correction unit adapted to correct errors in the moving image data by using the error correction check codes; and an error concealment unit adapted to select one of previous and following pictures of a current picture in accordance with the correlation information received by said receiver and to conceal uncorrectable errors in the image data by replacing image data in the current picture with image data of a selected picture in accordance with an error correction operation executed by said error correction unit.

2. An apparatus according to claim 1, wherein the image data are encoded in a block unit and said apparatus further comprises a decoding unit adapted to decode the encoded image data.

3. An apparatus according to claim 2, wherein the encoded image data are encoded by using an orthogonal transformation.

4. An apparatus according to claim 2, wherein said concealment unit replaces a block of image data in the current picture with a block of image data of the selected picture, and wherein the image data are encoded in a block unit that coincides with a block unit at which said error concealment unit operates.

5. An image processing method of concealing moving image data transmitted from a transmission apparatus, said method comprising the steps of:

receiving moving image data composed of a plurality of successive pictures, error correction check codes, and correlation information indicating correlations between the plurality of successive pictures of the moving image data through a transmission path, the correlation information having been generated by the transmission apparatus by detecting the correlations between the plurality of successive pictures of the moving image data and transmitted with the moving image data and the error correction check codes from the transmission apparatus through the transmission path;

correcting errors in the moving image data received in said receiving step by using the error correction check codes; and selecting one of previous and following pictures of a current picture in accordance with the correlation information received in said receiving step and concealing uncorrectable errors in the image data by replacing image data in the current picture with image data of a selected picture in accordance with an error correction operation executed in said correcting step.

6. A method according to claim 5, wherein the image data are encoded in a block unit and said method further comprises the step of decoding the encoded image data.

7. A method according to claim 6, wherein the encoded image data are encoded by using an orthogonal transformation.

8. An image processing apparatus for concealing uncorrectable errors in digital image data transmitted from a transmission apparatus, comprising:

a receiver arranged to receive digital image data composed of a plurality of successive frames and correlation information indicating correlations between the plurality of successive frames of the received digital image data through a transmission path, the correlation information having been generated by the transmission apparatus by detecting the correlations between the plurality of successive frames of the received digital image data and transmitted with the digital image data from the transmission apparatus through the transmission path; and a concealment unit adapted to select a frame from the plurality of successive frames of the received digital image data in accordance with the correlation information received by said receiver and to conceal uncorrectable errors in the received digital image data by using image data of the selected frame.

9. An image processing method for concealing uncorrectable errors in digital image data transmitted from a transmission apparatus, said method comprising the steps of:

receiving digital image data composed of a plurality of successive frames transmitted from the transmission apparatus; and concealing uncorrectable errors in the received digital image data, wherein correlation information indicating correlations between the plurality of successive frames of the received digital image data are generated by the transmission apparatus by detecting the correlations between the plurality of successive frames of the received digital image data and transmitted with the digital image data from the transmission apparatus through the transmission path, and wherein the uncorrectable errors in the received digital image data are concealed by using image data of a frame that is selected from the plurality of successive frames of the received digital image data in accordance with the correlation information transmitted by the transmission apparatus.

* * * * *

UNITED STATES PATENT AND TRADEMARK OFFICE
CERTIFICATE OF CORRECTION

PATENT NO. : 6,304,990 B1
DATED : October 16, 2001
INVENTOR(S) : Akihiro Shikakura et al.

It is certified that error appears in the above-identified patent and that said Letters Patent is hereby corrected as shown below:

Title page,
Item [30], FOREIGN APPLICATION PRIORITY DATA, "Dec. 29, 1991" should read -- Jan. 29, 1991 --.

Sheet 3,
Figure 4, "SPARA-" should read -- SEPARA --.

Column 4,
Line 6, "in" should read -- is --.

Column 10,
Line 27, "outputs-them" should read -- outputs them --.

Column 11,
Line 6, "may" should read -- may be --.
Line 60, "-memory." should read -- memory. --.
Line 61, "circuit-for" should read -- circuit for --.

Column 12,
Line 34, "During-transmission" should read -- During transmission --.
Line 36, "transmission-error" should read -- transmission error. --.

Signed and Sealed this

Twenty-fifth Day of June, 2002

Attest:

JAMES E. ROGAN
Attesting Officer
Director of the United States Patent and Trademark Office